United States Patent [19]
Stroup, Sr.

[11] Patent Number: 5,450,668
[45] Date of Patent: *Sep. 19, 1995

[54] METHOD AND APPARATUS FOR SEPARATING TUBING

[75] Inventor: Steven L. Stroup, Sr., Fort Wayne, Ind.

[73] Assignee: Crown Unlimited Machine, Inc., Bluffton, Ind.

[*] Notice: The portion of the term of this patent subsequent to Sep. 1, 2009 has been disclaimed.

[21] Appl. No.: 171,025

[22] Filed: Dec. 21, 1993

Related U.S. Application Data

[63] Continuation-in-part of Ser. No. 998,421, Dec. 30, 1992, abandoned.

[51] Int. Cl.[6] ............................... B26F 3/00
[52] U.S. Cl. .................... 29/890.053; 29/33 T; 29/413; 72/203; 225/2; 225/96.5; 225/101
[58] Field of Search .......... 225/2, 96, 96.5, 101, 225/103–105; 83/54, 636, 879, 880, 883; 72/70, 203, 204, 324; 29/90.01, 90.05, 33 T, 413, 414, 415, 417, 890.053, 564, 564.7

[56] References Cited

U.S. PATENT DOCUMENTS

| | | | |
|---|---|---|---|
| 2,348,283 | 5/1944 | Dolan | 72/203 X |
| 3,387,479 | 6/1968 | Winkler | 72/203 X |
| 3,980,442 | 9/1976 | Riekeles | 29/90.01 |
| 4,429,445 | 2/1984 | Fuminier | 29/33 T |
| 4,457,199 | 7/1984 | Corcoran | 83/883 X |
| 5,133,492 | 7/1992 | Wohrstein et al. | 225/2 |
| 5,143,268 | 9/1992 | Stroup, Jr. | 225/2 |
| 5,201,117 | 4/1993 | Wright | 225/96.5 X |
| 5,249,345 | 10/1993 | Virsik et al. | 225/2 X |

*Primary Examiner*—Eugenia Jones
*Attorney, Agent, or Firm*—Pearne, Gordon, McCoy & Granger

[57] ABSTRACT

Method and apparatus for separating thin-walled flat metal tubing are disclosed. The tubing has flat upper and lower walls joined by end walls. The tubing is partially severed by providing relative movement between the tubing and opposed cutting blades having straight or slightly curved cutting edges. The relative movement is transverse to the longitudinal axis of the tubing, and the straight slicing edges, or the chords of curved slicing blades, form a small acute angle with respect to the flat faces of the tubing. The tubing is completely severed by applying an axial force to the tubing. Pressing heads follow the slicing blades to press any burrs back into the tubing.

14 Claims, 10 Drawing Sheets

METHOD AND APPARATUS FOR SEPARATING TUBING

RELATED APPLICATION

This application is a Continuation-In-Part of application Ser. No. 07/998,421, filed Dec. 30, 1992, abandoned.

BACKGROUND OF THE INVENTION

This invention relates to tube cutting devices and techniques and, more particularly, to a method and apparatus for separating flat heat exchanger tubing into predetermined lengths having substantially burr-free parted ends.

Conventional heat exchanger tubing is fabricated from cylindrical, thin-walled copper pipe, which is bent into a serpentine pattern and provided with heat exchanging fins. It has long been recognized that care must be taken in cutting the tubing to minimize the formation of radially inwardly projecting burrs which are formed by the cutting tools. Typically, the tubing is cut by orbiting a cutting tool about the circumference of the tubing while moving the cutter inwardly.

Various mechanisms have been proposed to minimize the formation of burrs on such tubing. One such device is disclosed in U.S. Pat. No. 3,568,488 to Franks. According to the Franks patent, a tube is tightly gripped and placed under tension, and while the tube is tensioned, a cutting tool makes an annular cut in the periphery of the tube which penetrates into the wall of the tube. With the tension applied to the tube, the tensile strength of the tube wall not yet severed is exceeded, and the tube breaks. Consequently, the tube material is not cut entirely through, but partially cut and partially pulled apart at the cutting point. Therefore, the inwardly extending burr is minimized by the extruding caused by the pulling apart action. Other examples of tube cutting techniques may be found in U.S. Pat. Nos. 4,235,137; 4,112,294; and 3,692,219.

A recent development in heat exchanged tubing involves the provision of extruded flat tubing made from aluminum. The flat tubing has flat, parallel faces and rounded ends to define a flat, narrow interior channel. The interior channel is separated into a plurality of axially extending internal chambers defined by parallel walls extending perpendicularly between the flat walls of the tube. This arrangement provides a large surface area to the liquid flowing through the tube. Since the walls defining the internal chambers are so closely spaced, it is imperative that the severed ends of the tubing be substantially burr-free so that the burrs do not block the passages and do not interfere with an edge-to-edge tube joining operation or other operation involving the connection of the tube to a fluid source.

An improved tube parting technique has been developed to accommodate the dimensions and shape of the flat tubing which separates the tubing in such a manner that the separated end of the tubing is substantially burr-free. This improvement is set forth in U.S. Pat. No. 5,143,268, granted to Steven L. Stroup, Jr. According to the Stroup, Jr. patent, a length of flat metal tubing is clamped at spaced apart locations by gripping devices. Circular cutting or scoring blades deeply score lines of equal depth on opposite faces of the tubing with each line being in a plane normal to a longitudinal axis of the tubing. The scored lines do not penetrate the entire thickness of the flat tubing walls. A high impact force is imparted along the longitudinal axis of the tubing by sharply striking one of the gripping devices with a high impact force. The magnitude of the force is sufficient to separate the flat, parallel faces of the tubing at the score line and to separate the internal parallel walls and the rounded ends. The sudden impact fractures the tubing along the scored line without any substantial elongation or cold flow of the metal to thereby eliminate, or substantially reduce, burrs and necking down of the tubing.

Another technique for separating thin-walled multiport extrusion tubing is set forth in U.S. Pat. No. 5,133,492, granted to Wohrstein et al. According to the Wohrstein et al. patent, a length of tubing is clamped between upper and lower clamping members. The upper and lower clamping members include straight edged knife blades which are forced into the upper and lower walls of the tubing to a depth which is slightly less than the thickness of the upper and lower walls. The tubing is parted by drawing a first portion of the partially severed tubing away from a second portion of the tubing in a direction perpendicular to the grooves formed by the cutting blades. According to the patentees, the elongation characteristics of the metal is such that the metal necks down into a bell shape to minimize interference with the cross-sectional opening of the tubing.

One problem associated with the technique described in the Stroup, Jr. patent is the effect of the upper and lower circular cutting or scoring blades on the cross-section of the tubing as the line is being scored. The circular cutting blade is rotatably mounted, and the effective cutting area comprises the arc of the circle defined by the cutting blade as it engages the tubing wall. The length of this arc is extremely small and, therefore, significant inward force is exerted on the tubing by the cutters. As a result, care must be taken to avoid total severance of the flat walls since such severance would result in inwardly directed burrs. On the other hand, even when the walls are not completely severed, the walls tend to be crushed to thereby reduce the effective cross-section of the tube passages.

Similarly, in accordance with the teachings of Wohrstein et al., all of the cutting force is directed perpendicular to the faces of the extrusion, and inward deformation of the tubing is substantially unavoidable. Furthermore, since one aspect of the Wohrstein et al. technique relies upon the cutting blades to restrain the tube during the drawing process, the blades must have a thickness which is sufficient to resist the shear stresses imposed on the blades by the drawing operation. Since the thickness of the blades must be increased to provide resistance to shear, the metal displaced by the blades must necessarily tend to be displaced into the tube opening.

Applicant's co-pending application Ser. No. 07/998,421 provides method and apparatus for separating flat aluminum heat exchanger tubing by applying clamping pressure to the tubing at spaced apart locations and through cutting opposite parallel flat walls of the tubing transversely to the longitudinal axis of the tubing. The cutting blades have straight edges which are inclined at an angle to the flat faces of the tubing and which have a leading edge spaced outwardly with respect to the outer faces of the tubing, and a trailing edge which is spaced slightly inwardly with respect to the inside face of the flat tubing wall. The angle defined by the cutting blade with respect to the flat face of the tubing substantially corresponds to the angle formed by a diagonal of the cross-section of the tubing wall and a flat face of the wall. Because of the very small angle involved, cutting forces in a direction normal to the tube walls are small compared to cutting forces parallel to the walls. Thus, even where the cutting blade is set at a level which will completely sever the flat walls of the tube, burrs will not be directed inwardly to the tube passage. Also, since the cutting blades attack the tube wall at an attitude corresponding to the diagonal of the wall to be severed, the effective cutting stroke of the blade is twice the width of the tube. This may be contrasted with the total travel of opposed circular cutters in partially severing the opposed walls of the tube wherein such travel is slightly greater than the width of the tube, and the total travel of the cutters in the Wohrstein et al. patent wherein the total travel of the cutters is slightly less than the wall thickness. Since the total work involved in severing or nearly severing the opposed walls of the tube is identical in all of the above situations and since the cutting stroke, according to the present invention, is maximized, the forces associated with the cutting operation are minimized, particularly those forces normal to the plane of the flat walls of the tube.

After the opposed walls are severed, the tube is completely parted by applying an axial force to the tubing to exceed the ultimate strength of the unsevered tube sides and the plurality of internal parallel walls which define the axially extending internal chambers. According to a preferred aspect of this invention, the force applied to the tubing is a high impact force along the longitudinal axis of the tubing.

SUMMARY OF THE INVENTION

This application provides a further improvement over applicant's co-pending application. While the problem of inwardly directed burrs is substantially eliminated by the teachings of that application, it has been found that outwardly directed burrs are formed along the edges of the score line on the upper and lower flat parallel walls of the tubing. This is caused by the ploughing effect of the blades as they slice through the tubing. Although these burrs do not affect the quantity of flow through the tubing, the burrs create problems during the assembly of the tubes in the headers of a heat exchanger. The cut tube ends must be received with a minimal slip fit in slots provided in the header in order to provide a good brazing joint. The presence of outwardly directed burrs prevents proper insertion of the tubes in the slots for the brazing operation.

These burrs are eliminated by the provision of spring loaded spherical pressing heads which are provided on either side of the slicing blades to follow the sliced furrow and to force the burrs into the plane of the flat upper and lower faces of the tubing. In fact, the pressing heads tend to provide a slight lead taper on the tube in some instances.

Also, according to this invention, it has been found that the slicing blade may have a slightly curved edge without departing from the novel aspects of this invention. Specifically, the blade may comprise a circular segment having a circular arc defined by identical chords which diverge from a vertical radius. The chords should correspond in angularity and linear extent to the angularity and linear extent of the straight edges of the previously described straight edges of the cutting blades. The radius of the arc may, therefor, be calculated by Huygen's approximate formula:

$$r = \frac{l}{2\sin\frac{\Theta}{2}}$$

where:
l is the chord of the entire arc, and $\Theta$ is the central angle defined (approximate for small angles)

DETAILED DESCRIPTION OF THE DRAWINGS

Figure 1:
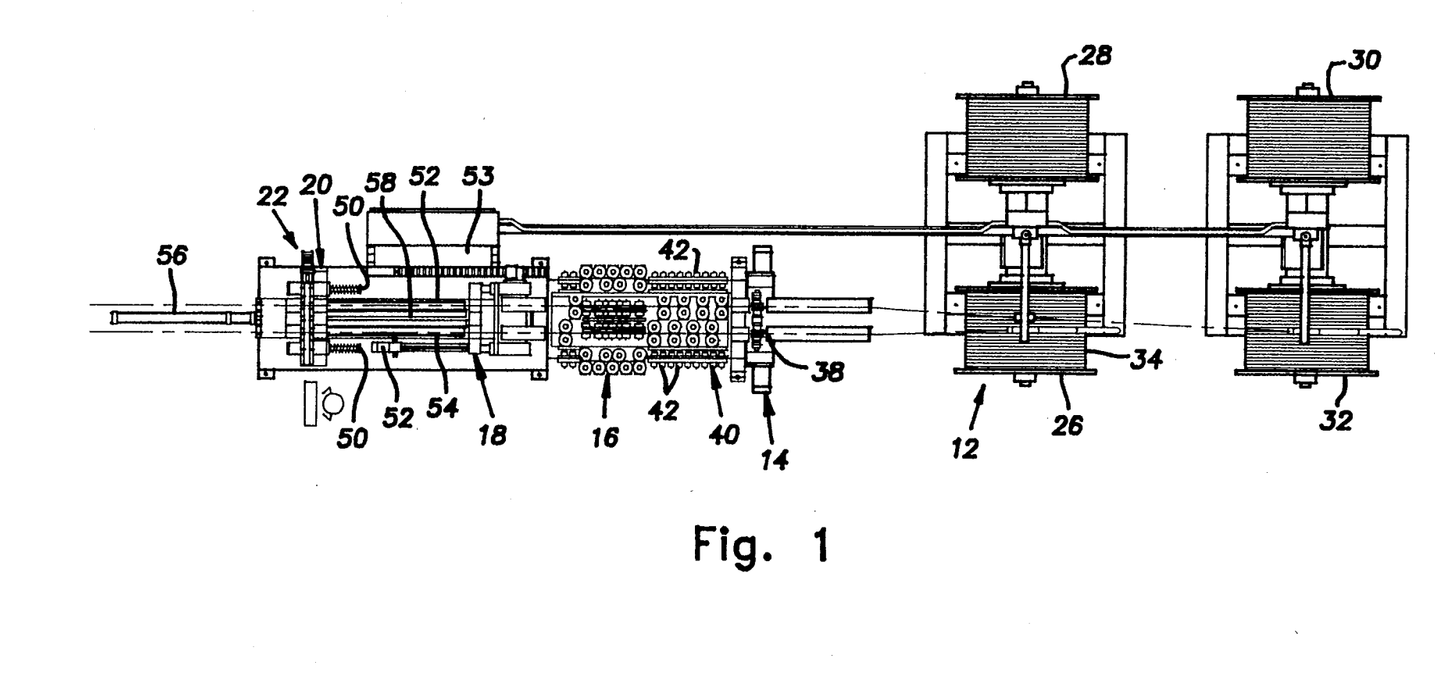
FIG. 1 is a plan view of a machine for separating lengths of flat metal tubing, according to this invention.
Figure 2:
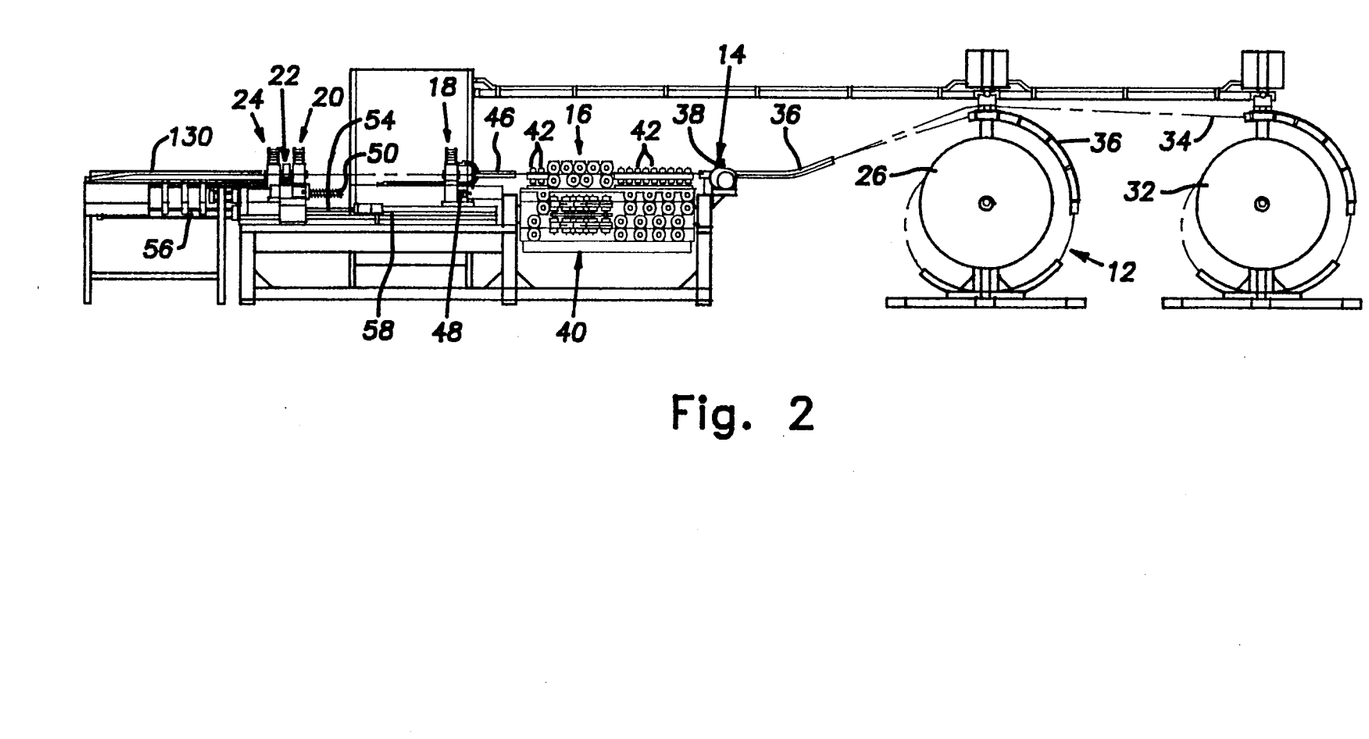
FIG. 2 is an elevational view of the machine illustrated in FIG. 1.
Figure 3:
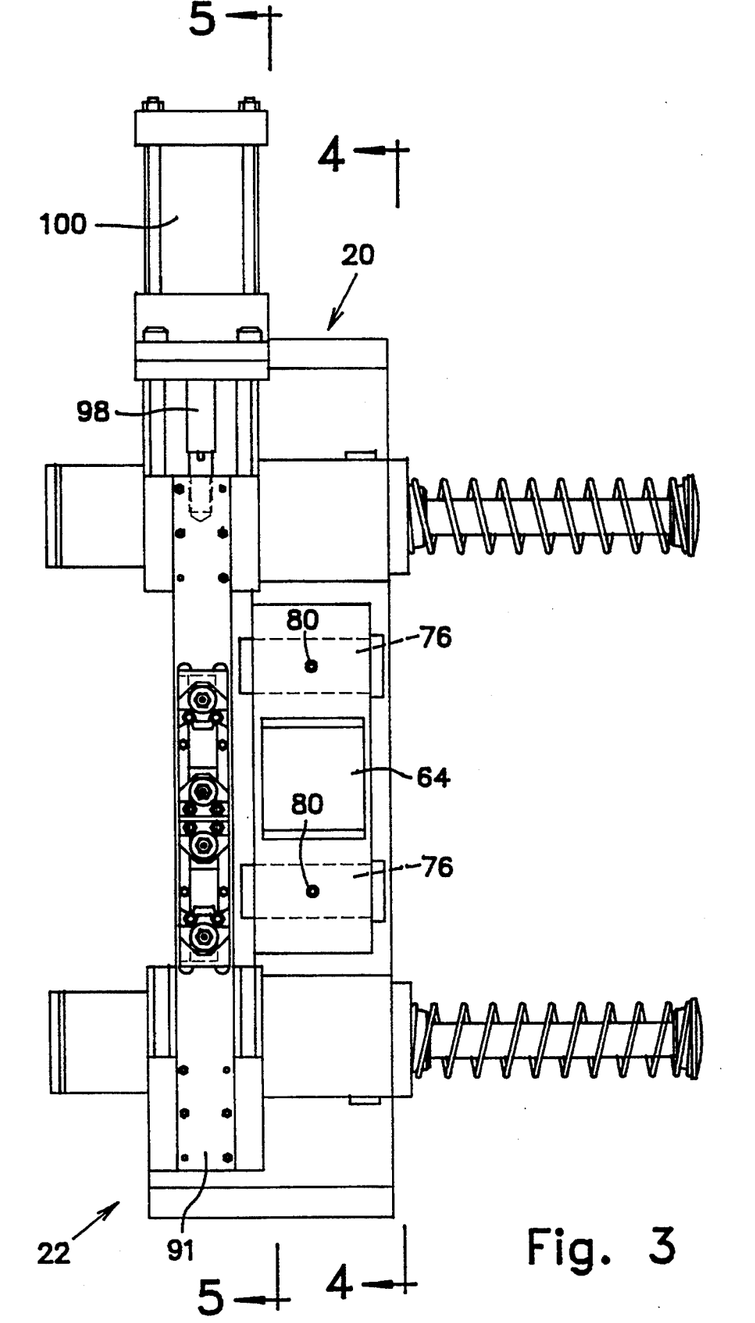
FIG. 3 is a plan view of the scoring head portion of the machine.
Figure 3A:
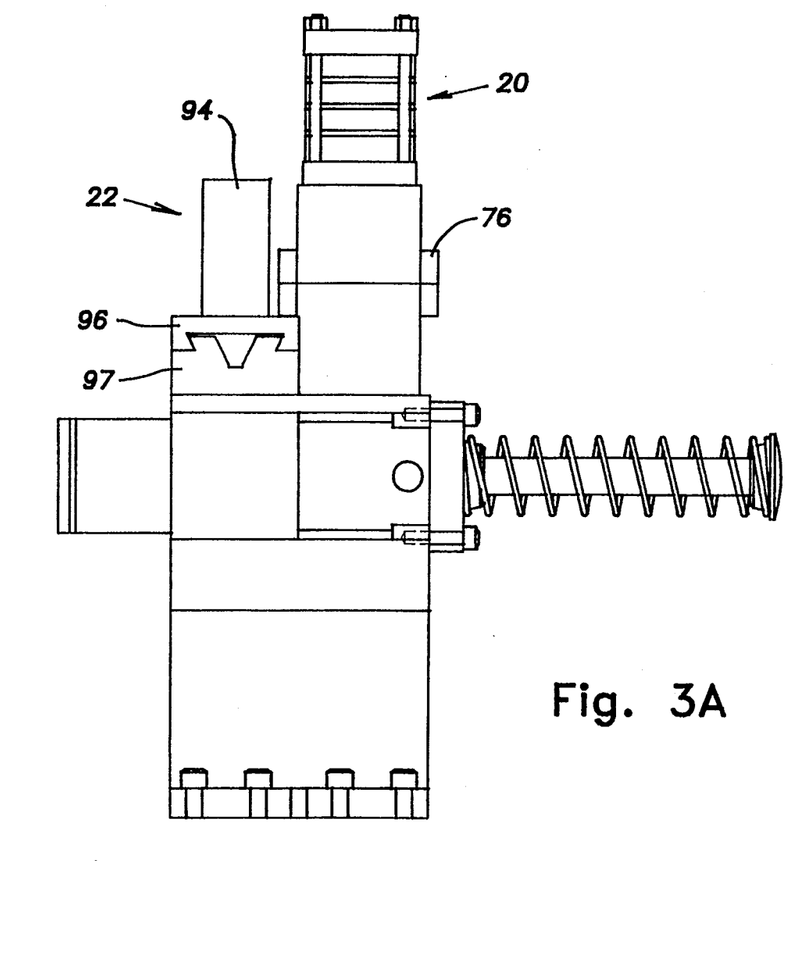
FIG. 3A is an elevational view of the portion illustrated in FIG. 3.

Referring now to the drawings, and particularly, to FIGS. 1 and 2, there is illustrated an apparatus 10 for separating an indeterminate length of flat metal tubing into predetermined lengths. The apparatus 10 includes a conventional uncoiler assembly 12 which uncoils the stock upon demand, a stock feed roll assembly 14, a straightening and sizing assembly 16, a clamping assembly 18 for incrementally feeding the stock, a clamping assembly 20 for stabilizing the stock during a cutting and parting operation, a cutter assembly 22, and a clamping assembly 24 for parting the stock by impact.

As may be noted, the stock uncoiler assembly includes spool mounts 26, 28, 30 and 32, having coiled flat tubing 34 wound thereon. The spool mounts 26 and 32 are in an active working position to feed tubing 34 to the powered feed station 14. The spool mounts 28 and 30 are in a standby, ready position.

The tubing 34 is fed through guide tubes 36 to the feed roller assembly 14 which includes feed rollers 38. From the feed rollers, the tubing 34 is laced through the straightening and sizing assembly 16. The straightening and sizing assembly 16 is a conventional device which includes a turret 40 having tooling fixtures or rollers 42 on each face so that the turret may be positioned to accommodate tubing of different widths and thicknesses. The tubing 34 is fed through a guide 46 to the clamping assembly 18 which is similar to the other clamping assemblies 20 and 24, and the clamping function of those assemblies will be described in greater detail.

The clamping assembly 18 is adapted to grip the tubing and advance a length of the tubing through the clamping assemblies 20 and 24 a distance which corresponds to the distance between adjustable stops 48 and 50. As will become apparent, the distance between the stops 48 and 50 corresponds to the desired axial extent of the tubing. A linear actuator 52 is preset to this desired length, and the linear actuator establishes the position of the stop 48 for accurate length control.

The clamping assembly 18 is mounted on guide rods 53 and 54, and the assembly 18 is reciprocated by a feed cylinder 56 having a piston rod 58 fixed to the assembly 18. Reciprocation of the assembly 18 toward the assembly 20, and with the assembly 18 in a clamped condition, the assembly 18 axially advances a pair of parallel tubing lengths through the assemblies 20 and 24 which are in an unclamped condition and through the interposed cutting assembly 22. When the assembly 18 is fully advanced against the stops 50, the clamp 18 is released and the assembly 18 is returned to its illustrated position. Prior to the release of the clamping assembly 18 and while the assembly 18 is against its stop 50, the clamping assemblies 20 and 24 are actuated to firmly grip the tubing 34. Since the assemblies 18, 20 and 24 are substantially identical, the assembly 20 will be described herein as representative of the other clamping assemblies.

Figure 4:
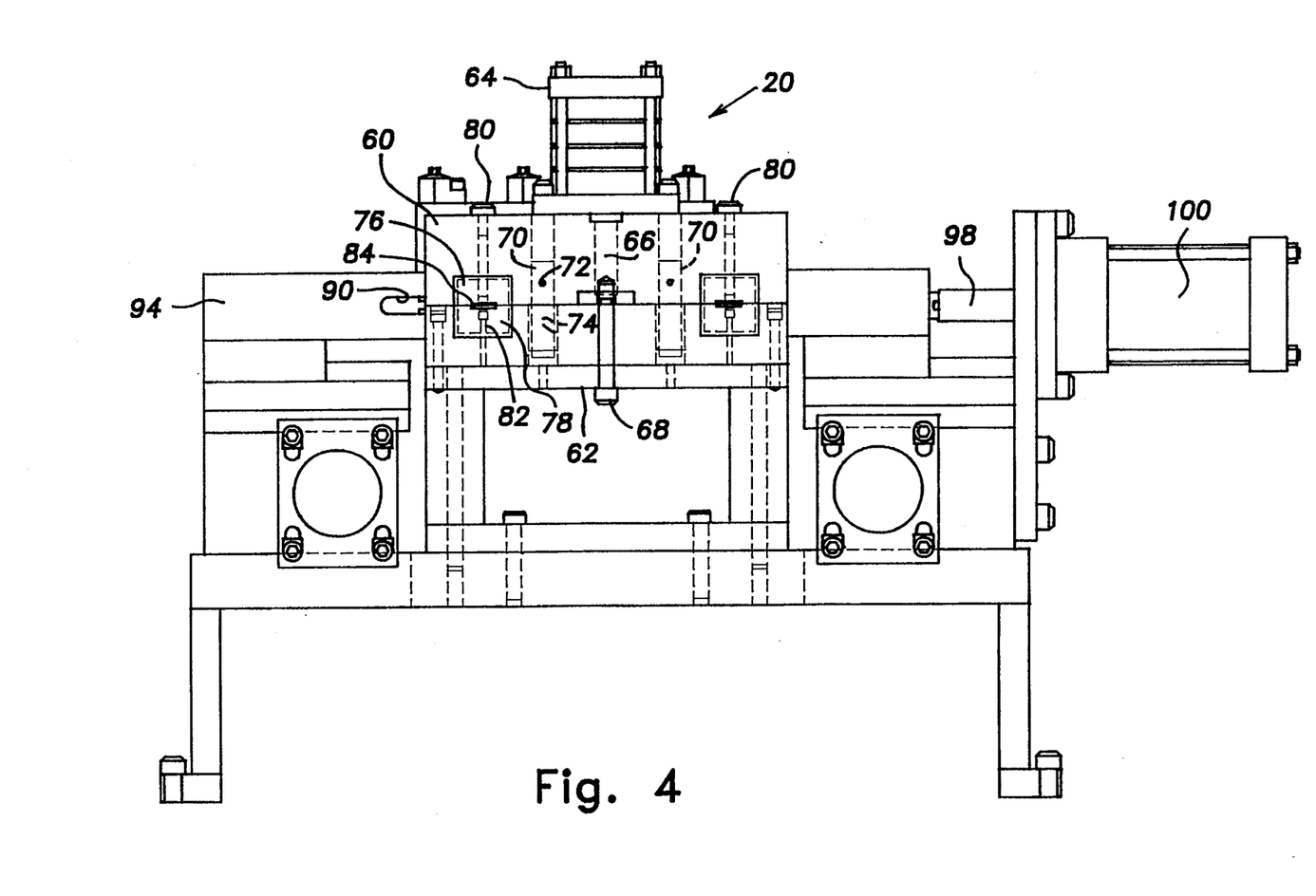
FIG. 4 is a cross-sectional view, the plane of the section being indicated by the line 4—4 in FIG. 3.

The clamping assembly 20 (FIG. 4) includes a fixed upper platen and a moveable lower platen 62. The upper platen 60 has a pneumatic powered cylinder 64 mounted thereon, and the cylinder 64 has a piston rod 66 slideably projecting through the platen 60. A fastening bolt 68 extends through the moveable platen 62 and into the rod 66 so that the moveable platen 62 may be released from its illustrated closed clamping position. During such movement, the lower platen 62 is guided by rods 70 fixed in the upper platen 60 by set screws 72 and received in guide bores 74 in the platen 62. The platens 60 and 62 are provided with upper and lower die sets 76 and 78, respectively. The upper die sets are retained by fasteners 80, and the lower die sets are fixed by fasteners 82. Each die set 76 and 78 cooperate to define a clamping opening 84 which has a cross-section corresponding to the cross-section of the tubing 34 to establish a slight interference with the tubing as the die sets 76 and 78 cooperate to clamp the tubing.

With the clamping assemblies 20 and 24 securely holding the length of the tubing advanced by the assembly 18, the tubing is partially severed by cutting according to the following procedure. The cutting assembly 22 is interposed between the assemblies 20 and 24 so that the tubing projects through elongated apertures 90 and 92 in a beam 94. The beam 94 is mounted on a guide block 96 which cooperates with a dovetail block 97. One end of the beam 94 is fixed to a piston rod 98 associated with a power cylinder which is adapted to shift the position of the beam from its illustrated position to a position adjacent the cylinder 100.

Upper and lower slicing blades 102 and 104, respectively, are mounted on the beam 94 so that their slicing edges project into the apertures 90 and 92. One of the slicing blades 102 is illustrated in more detail in FIG. 10.

Figures 8, 9, 10:
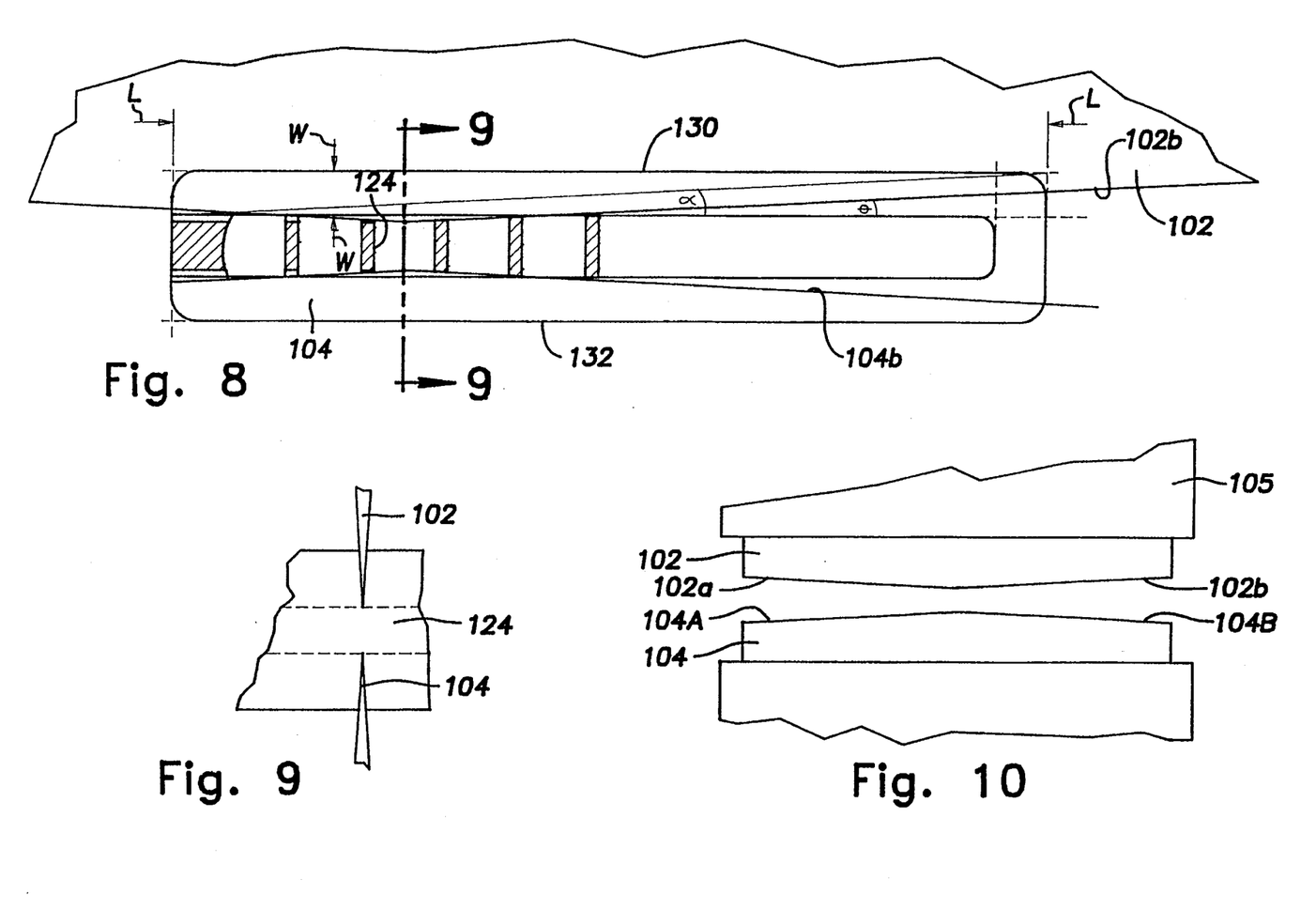
FIG. 8 is an enlarged elevational view of a pair of cutting blades illustrating the relationship between the cutting blades and the flat tubing during the cutting stroke of the blades.
FIG. 9 is a cross-sectional view, the plane of the section being indicated by the line 9—9 in FIG. 8.
FIG. 10 is an elevational view of a pair of opposed cutting blades.

The slicing blades 102 and 104 are, preferably, fabricated from four-hundred series surgical grade stainless steel with cutting edges that define a total included angle of about ten degrees. Each blade 102 and 104 has a pair of straight slicing edges 102a, 102b, 104a and 104b. The slicing edges 102a and 102b form an acute angle with the top and bottom surfaces of the tubing, as will be described in further detail. Each blade 102 is mounted on a vertically adjustable yoke 105 so that the spacing between the blades 102 and 104 may be adjusted by a threaded shaft 106. By shifting the beam 94 from its illustrated position to a position adjacent the power cylinder 100, the edges 102b and 104b slice through the upper and lower flat parallel walls 130 and 132, respectively. This slicing action completely severs the walls 130 and 132, but since the slicing edges 102b and 104b project only slightly beyond the thickness of the walls 130 and 132 and because of the very small angle formed by the slicing edges 102b and 104b with respect to the walls 130 and 132, the formation of inwardly directed burrs is minimized, if not entirely eliminated.

The slicing edges 102a, 102b, 104a and 104b all form angles $\Theta$ with respect to the faces of the walls 130 and 132. The angle $\Theta$ corresponds to the angle $\alpha$ formed by the diagonal of a rectangle which corresponds to the rectangles formed by the walls 130 and 132 having a length indicated by the arrows "L" and a width indicated by the arrows "W". It may be noted that the cutting stroke of the blades 102 and 104 is about twice the width of the tube and that during this stroke, very little cutting pressure is applied in the vertical direction to the walls 130 and 132 since the applied cutting force is horizontal and the vertical components of that force correspond to the sine of the cutting angle $\Theta$. The angle $\Theta$ is, preferably, less than two degrees, and for a tube having a width of 0.69 inch and a thickness of 0.016 inch, the cutting angle would be one degree twenty minutes.

Figure 5:
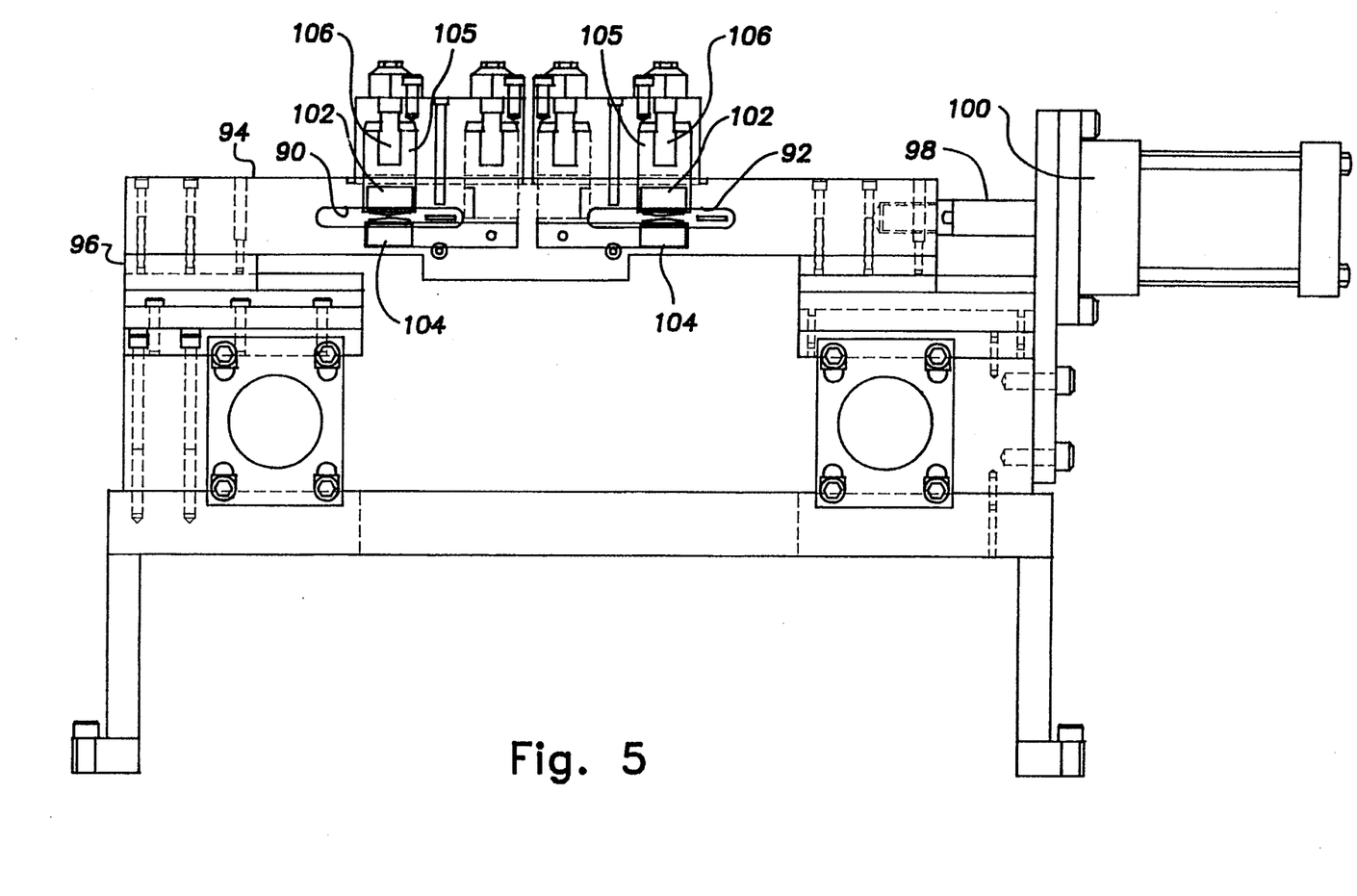
FIG. 5 is a cross-sectional view, the plane of the section being indicated by the line 4—4 in FIG. 3.
Figure 6:
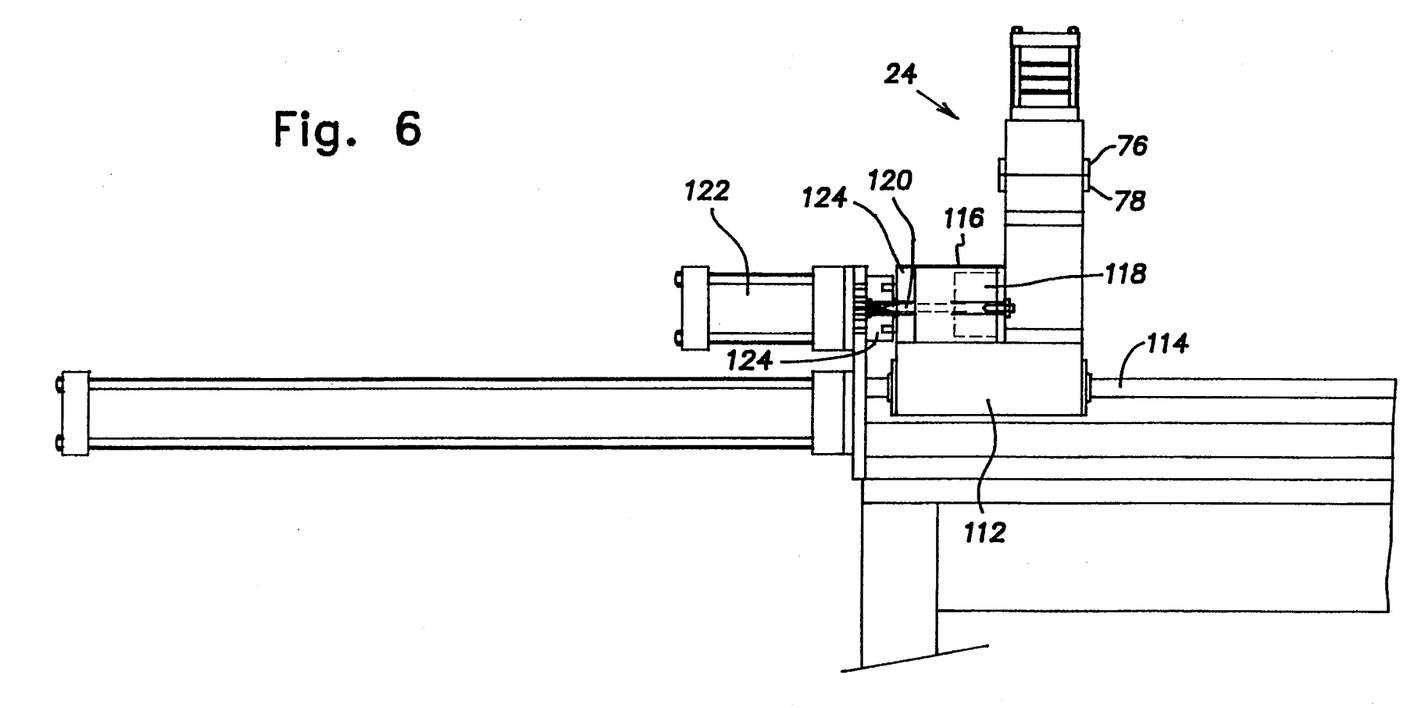
FIG. 6 is an elevational view of a tension clamp and an impact unit associated with that clamp.
Figure 7:
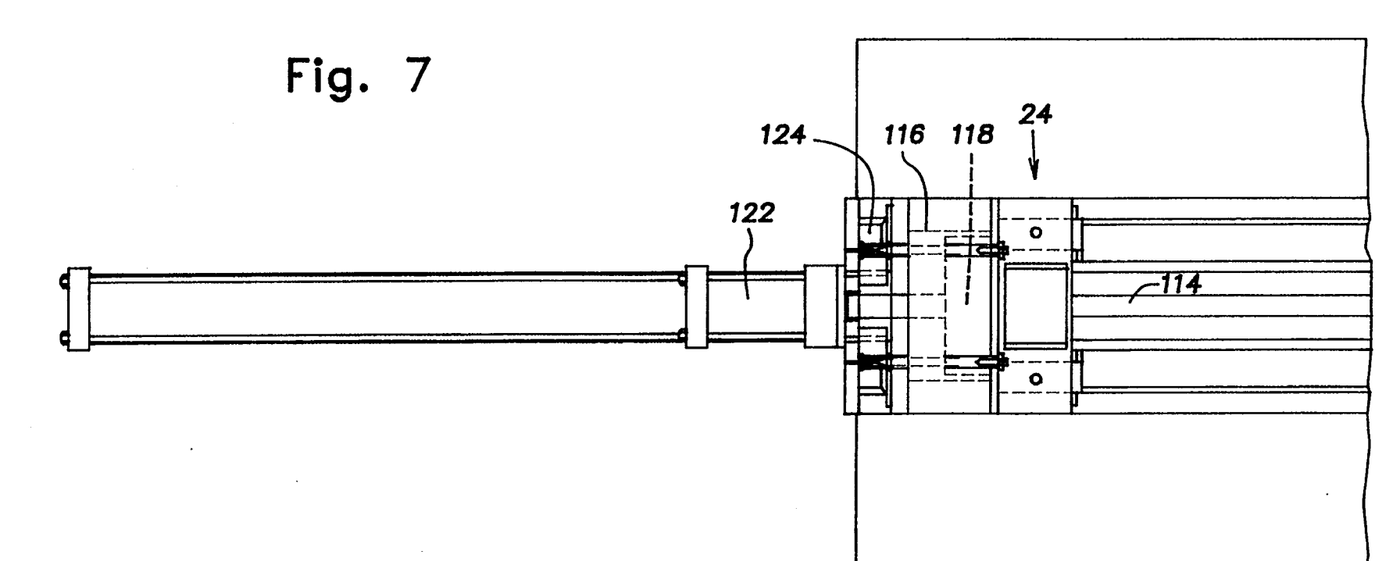
FIG. 7 is a plan view of the unit illustrated in FIG. 5.

After the tubing has been partially cut in this manner and while the clamping assemblies 20 and 24 retain their grip on the tubing, the tubing is completely parted in the following manner. Referring to FIGS. 6 and 7, the assembly 24 further includes a base 112. An anvil 118 is mounted within the cylinder 116 and is carried by a piston rod 120 which projects from a pneumatically operated power cylinder 122. Severing impact is applied to the tubing 34 by actuating the cylinder 122 to rapidly retract the piston rod 120 so that the anvil 118 strikes a wall 124 of the cylinder 116 to quickly move the entire assembly 24 to the left, as viewed in FIG. 5, and against a cushioning mechanism. The sharp impact on the assembly 24 fractures the walls 124 in a burr-free manner since the tubing is not able to elongate as it would if a steady tensile force were applied to the tubing. The assembly 24 releases the severed tubing, and the tubing is deposited on a collection table 130. The assembly 20 also releases its grip on the tubing, and the tubing is incrementally advanced through the assemblies 20, 22 and 24, so that the operation may be repeated.

While it is preferable to apply the above described impact force to the tubing to perform the final separating operation, normally applied tensile forces may be employed since necking down of the walls 124 will not significantly impede the flow of fluid through the tubing. Thus, the invention is not limited to the sudden application of tensile forces on the tubing.

Figure 11:
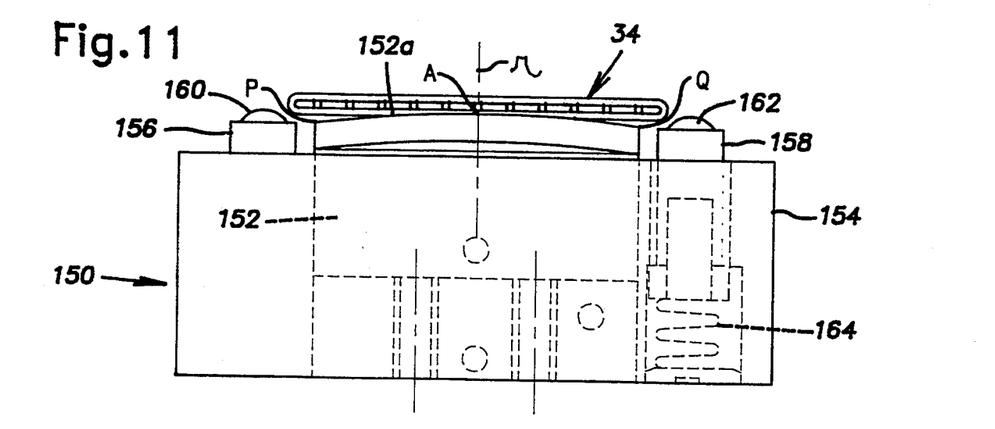
FIG. 11 is an elevational view of a slicing blade assembly according to a further aspect of this invention.

Referring now to FIG. 11, there is shown a slicing blade assembly 150 according to a further aspect of this invention. The blade assembly 150 corresponds to the lower slicing blade 104 and may be mounted in place of the blade 104 on the beam 94. An upper blade assembly (not shown) corresponding to the assembly 150 is also mounted on the beam 94 to cooperate with the assembly 150 in slicing the tube.

The assembly 150 includes a slicing blade 152 having a curved edge 152a. The blade 152 is mounted in a block 154. Ball cartridges 156 and 158 having stationary spherical ceramic pressing heads 160 and 162 are mounted in the block 154 on either side of the blade 152 so that the centers of the heads 160 and 162 are in a plane defined by the blade 152. The cartridges 156 and 158 are biased upwardly toward the bottom wall 132 of tubing 34 by springs 164.

Figure 14:
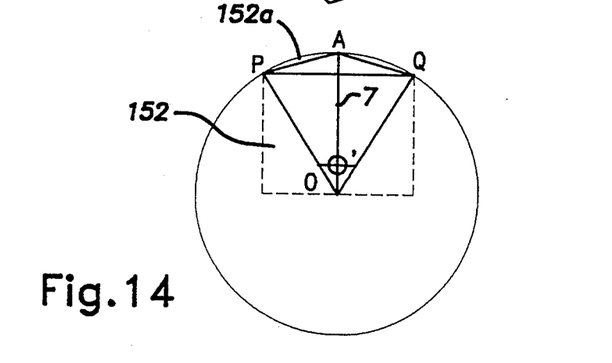
FIG. 14 is a geometric representation of a curved slicing blade.

The curved edge 152a of the blade 152 has an arcuate extent PAQ defined by a chord PQ (and see FIG. 14). A chord PA and a chord AQ diverge from a vertical radius r and each chord PA and AQ correspond in angularity and linear extent to the angularity and linear extent of the slicing edges 104a and 104b. The radius of the arc PAQ may be calculated by Huygen's approximate formula with errors proportional to the size of Θ:

$$r = \frac{l}{2\sin\frac{\Theta}{2}}$$

where
l=PAQ
Θ=central angle

The curved blade performs comparable to the straight blade but is much easier to manufacture.

Figure 12:
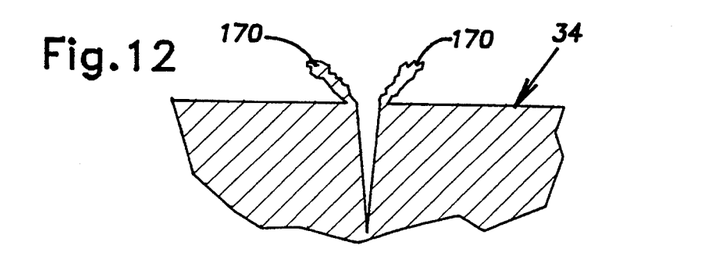
FIG. 12 is a fragmentary cross-sectional view illustrating edge burrs formed by a slicing blade.
Figure 13:
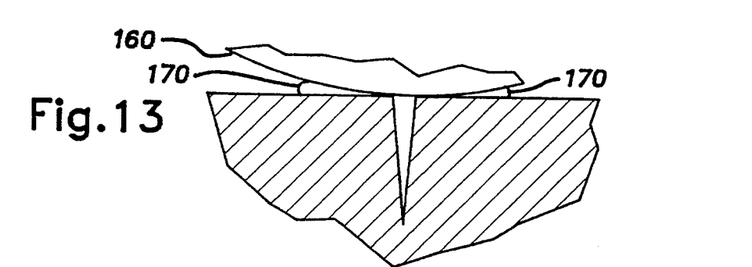
FIG. 13 is a view similar to FIG. 12 but showing the burrs flattened by a pressing head.

While the slicing blades according to this invention substantially eliminate the problems of inwardly directed burrs, some outwardly directed burrs 170 (FIG. 12) are formed by the slicing action. These burrs 170 are pressed back into the flat face of the tubing 34 by one of the heads 160 or 162, depending upon the direction of movement of the beam 94 and the slicing blade 152. As the blade 152 traverses the tubing 34 to slice the tubing and create the burrs 170, a trailing head 160 or 162, having its center vertically aligned with the plane of the blade 152, rides over the burrs 170 to press the burrs into the face of the tubing 34. This may be seen most clearly in FIG. 13.

It should be apparent that the use of the heads 160 and 162 may be applied to the embodiment of the invention illustrated in FIGS. 1-10.

The invention is not limited to the specific aspects of the preferred embodiment of the invention shown and described. It should be understood that various modifications and rearrangements of the parts may be resorted to without departing from the scope of the invention as disclosed and claimed herein.

What is claimed is:

1. A method of separating an intermediate length of hollow, thin-walled flat metal tubing into predetermined lengths having substantially burr-free parted ends comprising the steps of providing a length of hollow flat tubing having flat upper and lower walls joined by end walls, partially severing the tubing by providing relative movement between said tubing and opposed cutting blades having curved slicing edges, said curved slicing edges having a leading end which travels along a line which is spaced outwardly from an outside face of the respective upper and lower walls during said relative movement and a trailing end which travels along a line which is located substantially in a plane defined by an inside face of the respective upper and lower walls, said relative movement being solely in a direction generally parallel to the upper and lower walls and transverse to a longitudinal axis of said tubing to cut into each upper and lower wall, and completely severing the tubing by applying an axial force to said tubing sufficient to exceed the ultimate strength of said tubing.

2. A method according to claim 1, wherein the partial severing step includes the step of completely severing the upper and lower walls.

3. A method according to claim 1, wherein a chord of an arc connecting said leading and trailing ends defines an acute angle with respect to said upper and lower walls.

4. A method according to claim 3, wherein said slicing blades are moved relative to the tubing with a lateral slicing force in said direction transverse to said longitudinal axis of said tubing, each said lateral slicing force having a component directed normal to said outside face of the respective upper and lower walls of said tubing, the magnitude of said component corresponding to the sine of said acute angle.

5. A method according to claim 3, wherein said tubing has a substantially transverse cross-section and wherein said acute angle corresponds to an angle defined by one of said upper and lower walls and a diagonal of said cross-section.

6. A method according to claim 5, wherein said angle is less than two degrees.

7. A method according to claim 6, wherein said angle is about one degree twenty minutes.

8. A method according to claim 1, wherein said step of completely severing said tubing comprises the step of applying a high impact force along said longitudinal axis of said tubing.

9. A method according to claim 1, including the step of applying a pressing force to faces of the respective upper and lower walls after said partial severing step to press any outwardly extending burrs into the faces of said walls.

10. A method according to claim 9, wherein said pressing force is applied by a pressing head moving in said direction and following said slicing blades.

11. Apparatus for separating an intermediate length of hollow, thin-walled flat metal tubing having flat upper and lower walls joined by end walls into predetermined lengths having substantially burr-free parted ends comprising means for feeding a length of hollow, thin-walled flat metal tubing to first and second gripping means, said first and second gripping means being axially spaced apart, slicing means interposed between said gripping means, said slicing means including slicing blades rigidly fixed to a transverse slide holding the blades stationary on a first slide axis normal to a longitudinal axis of said tubing during a slicing action of the blades, said slicing blades each having a curved slicing edge, means for moving said transverse slide on a second slide axis transverse to the longitudinal axis of the tubing, said curved slicing edges of the slicing blades having a leading end which, upon movement of said transverse slide along said second slide axis, travels along a line which is spaced outwardly from an outside face of the respective upper and lower walls and a trailing end which, upon said movement, travels along a line which is located substantially in a plane defined by an inside face of the respective upper and lower walls, and means to apply a separating force along the longitudinal axis of said tubing in a direction away from the transverse slide.

12. Apparatus according to claim 11, wherein a chord of an arc connecting said leading and trailing ends defines an acute angle with respect to said upper and lower walls.

13. Apparatus according to claim 12, including means on said transverse slide for engaging the faces of said tubing to apply a pressing force to the respective upper and lower walls to press any outwardly extending burrs into the faces of said walls.

14. Apparatus according to claim 13, wherein said means to apply a pressing force comprises a spherical pressing head.

* * * * *